US008469813B2

(12) United States Patent
Joshi et al.

(10) Patent No.: US 8,469,813 B2
(45) Date of Patent: Jun. 25, 2013

(54) STORING AND USING CASINO CONTENT

(75) Inventors: Shridhar P. Joshi, Naperville, IL (US); Jeremie D. Moll, Chicago, IL (US); Larry J. Pacey, Northbrook, IL (US); Richard T. Schwartz, Chicago, IL (US)

(73) Assignee: WMS Gaming, Inc., Waukegan, IL (US)

( * ) Notice: Subject to any disclaimer, the term of this patent is extended or adjusted under 35 U.S.C. 154(b) by 0 days.

(21) Appl. No.: 13/129,022

(22) PCT Filed: Nov. 13, 2009

(86) PCT No.: PCT/US2009/064481
§ 371 (c)(1),
(2), (4) Date: May 12, 2001

(87) PCT Pub. No.: WO2010/057057
PCT Pub. Date: May 20, 2010

(65) Prior Publication Data
US 2011/0218044 A1 Sep. 8, 2011

Related U.S. Application Data

(60) Provisional application No. 61/114,755, filed on Nov. 14, 2008.

(51) Int. Cl.
*A63F 9/24* (2006.01)
(52) U.S. Cl.
USPC .......... 463/37; 463/25; 463/42; 463/12; 463/20; 705/14.68
(58) Field of Classification Search
None
See application file for complete search history.

(56) References Cited

U.S. PATENT DOCUMENTS

| 6,813,775 | B1 | 11/2004 | Finseth et al. | |
|---|---|---|---|---|
| 8,060,407 | B1* | 11/2011 | Delker et al. | 705/14.68 |
| 2002/0151359 | A1* | 10/2002 | Rowe | 463/29 |
| 2003/0003988 | A1* | 1/2003 | Walker et al. | 463/21 |
| 2003/0125104 | A1* | 7/2003 | Walker et al. | 463/20 |
| 2005/0148377 | A1* | 7/2005 | Goldberg et al. | 463/12 |

(Continued)

FOREIGN PATENT DOCUMENTS
WO WO2010057057 5/2010

OTHER PUBLICATIONS

"PCT Application No. PCT/US09/64481 International Preliminary Report on Patentability", Mar. 14, 2011, 15 pages.
"PCT Application No. PCT/US09/64481 International Search Report", Jan. 13, 2010, 9 pages.

*Primary Examiner* — Paul A. D'Agostino
(74) *Attorney, Agent, or Firm* — DeLizio Gilliam, PLLC

(57) ABSTRACT

A wagering game system and operations are described herein. The operations can include presenting selectable casino content on a casino display device and determining a selection of the casino content (e.g., by a wagering game player account, by a casino patron, etc.). The operations can further include determining data from the selectable casino content, such as viewable portions of the casino content or metadata associated with casino content. The operations can further include sending the data to be saved in a user accessible storage, such as to a user accessible storage device or a web account associated with a casino user or social contact. In some embodiments, the operations can also include analyzing the selected casino content to generate analytics that can be used to determine targeted content (e.g., targeted advertisements, targeted wagering games, etc.) that can be presented or suggested to a wagering game player.

19 Claims, 9 Drawing Sheets

U.S. PATENT DOCUMENTS

| | | | |
|---|---|---|---|
| 2005/0261053 A1* | 11/2005 | Walker et al. | 463/20 |
| 2006/0046838 A1* | 3/2006 | Paulsen et al. | 463/25 |
| 2006/0240894 A1* | 10/2006 | Andrews | 463/42 |
| 2007/0060305 A1 | 3/2007 | Amaitis et al. | |
| 2008/0020788 A1 | 1/2008 | Griswold et al. | |
| 2009/0093292 A1* | 4/2009 | Randhawa | 463/17 |
| 2009/0149246 A1* | 6/2009 | Opaluch | 463/29 |
| 2009/0247282 A1* | 10/2009 | Cheng | 463/25 |
| 2009/0318231 A1* | 12/2009 | Lange | 463/42 |

* cited by examiner

STORING AND USING CASINO CONTENT

RELATED APPLICATIONS

This application claims the priority benefit of U.S. Provisional Application Ser. No. 61/114,755 filed Nov. 14, 2008.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2009, WMS Gaming, Inc.

TECHNICAL FIELD

Embodiments of the inventive subject matter relate generally to wagering game systems, and more particularly to devices and processes that utilize content in wagering game systems and networks.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

SUMMARY

In some embodiments, a method comprises presenting selectable casino content on a casino display device, wherein the selectable casino content is configured to be selected by a casino user; determining a selection of the selectable casino content by the casino user, locating a user account associated with the casino user, the user account being associated with at least one content-storage location; determining casino content data from the selectable casino content, wherein the casino content data includes at least some presented portion of the selectable casino content; and sending the casino content data to the at least one content-storage location associated with the user account.

In some embodiments, the casino content data comprises one or more of viewable graphics, sound files, object properties, metadata, and commands related to the one or more casino content items.

In some embodiments, the method further comprises determining user data from the user account; presenting the casino content data to the user account; and prioritizing the presentation of the casino content data using the user data.

In some embodiments, the method further comprises determining a web account associated with the user account, wherein the at least one content-storage location is accessible via the web account; and presenting the casino content data using the web account.

In some embodiments, the method further comprises determining one or more social contact accounts associated with the user account; and sending the data to the one or more social contact accounts.

In some embodiments, the method further comprises determining a modification request by the user account to modify the casino content data; and modifying the casino content data according to the modification request.

In some embodiments, one or more machine-readable storage medium having instructions stored thereon, which when executed by a set of one or more processors causes the set of one or more processors to perform operations comprising determining one or more selections by a user account of one or more selectable casino content items on a casino display; determining data from the one or more selectable casino content items; analyzing the one or more selections to generate analytics regarding preferences for casino content; determining, using the analytics, one or more additional casino content items to present to the user account; and transmitting the data to a storage that is accessible to the user account.

In some embodiments, the operations further comprising presenting the data to the user account.

In some embodiments, the operations further comprising reproducing portions of the one or more selectable casino content items; packaging the reproduced portions into one or more files; transmitting the one or more files to a storage associated with the user account; and saving the one or more files in the storage for review by the user account.

In some embodiments, the operations further comprising using an account preference to determine personal content that a casino user prefers; and presenting the personal content to the casino user during a wagering game session.

In some embodiments, the operations further comprising determining that the user account meets a level of wagering game activity to present the personal content.

In some embodiments, a system comprises a casino device comprises an electronic presentation device to present casino content; and a content controller to determine one or more selections of the casino content items by a user account, and send data for the casino content to a user accessible storage device. The system can also include a casino content server comprising a content selection analyzer configured to analyze the one or more selections of the casino content resulting in analytics specific to the user account, and determine one or more additional casino content items, using the analytics, that are targeted to the user account. the content selection analyzer can also present the one or more additional casino content items to the user account.

In some embodiments, the system further comprises a user device that includes indentifying information about the user account, wherein the casino device is further configured to detect that the user device is within a pre-determined proximity range to the casino display device, determine the user account using the identifying information, and present the one or more additional casino content items on the electronic presentation device.

In some embodiments, content selection analyzer is further configured to predict preference information from the analytics, wherein the preference information relates to user preferences indicated in the user account, and present the one or more additional casino content items based on the preference information.

In some embodiments, the system further comprises an account server configured to store content selection configuration settings, and wherein the content controller is configured to use the content selection configuration settings to determine the one or more selections.

In some embodiments, the system further comprises a web server configured to store web account preferences related to the user account, and wherein the content selection analyzer is further configured to determine the one or more additional casino content items using the web account preferences.

In some embodiments, the system further comprises an advertising server configured to store one or more advertisements with descriptive identifiers, match analytics properties to the descriptive identifiers for one or more advertisements, and provide the one or more advertisements to the casino content server to present with the additional casino content items.

In some embodiments, an apparatus comprises a casino content module configured to determine one or more preferences for a user account, determine a history of casino content selections by the user account, and determine targeted content, using one or more of the preferences and the history of casino content selections. The casino content module can also present the targeted content to the user account when the user account is active.

In some embodiments, the casino content module is further configured to match properties of the one or more preferences and the history of casino content selections to similar properties for advertisements stored within an advertising server.

In some embodiments, the casino content module is further configured to detect a wireless signal from a user device that is within a pre-determined proximity to a casino display, wherein the wireless signal includes indentifying information that identifies the user account.

In some embodiments, the targeted content comprises advertising content from one or more advertisers that market to the user account based on the one or more of the preferences and the history of casino content selections.

In some embodiments, an apparatus comprises means for determining a selection by a user account of a portion of casino content presented on a casino device; means for generating an electronic file containing a copy of the portion of selected portion of content; means for determining one or more social contacts associated with the user account; and means for transmitting the electronic file to the one or more social contact accounts.

In some embodiments, the apparatus further comprises means for determining groupings of social contact accounts based on information provided on the user account.

In some embodiments, the apparatus further comprises means for transmitting the electronic file to a user accessible storage associated with the user account.

In some embodiments, the apparatus further comprises means for determining one or more preferences for one or more of the social contact accounts and the user account; means for determining one or more advertisements using the preferences; and means for presenting the one or more advertisements to the one or more of the social contact accounts and the user account.

BRIEF DESCRIPTION OF THE DRAWING(S)

Embodiments are illustrated in the Figures of the accompanying drawings in which.

DESCRIPTION OF ILLUSTRATIVE EMBODIMENTS

This description of the embodiments is divided into six sections. The first section provides an introduction to embodiments. The second section describes example operating environments while the third section describes example operations performed by some embodiments. The fourth section describes additional example embodiments while the fifth section describes additional example operating environments. The sixth section presents some general comments.

Introduction

This section provides an introduction to some embodiments.

Figure 1:
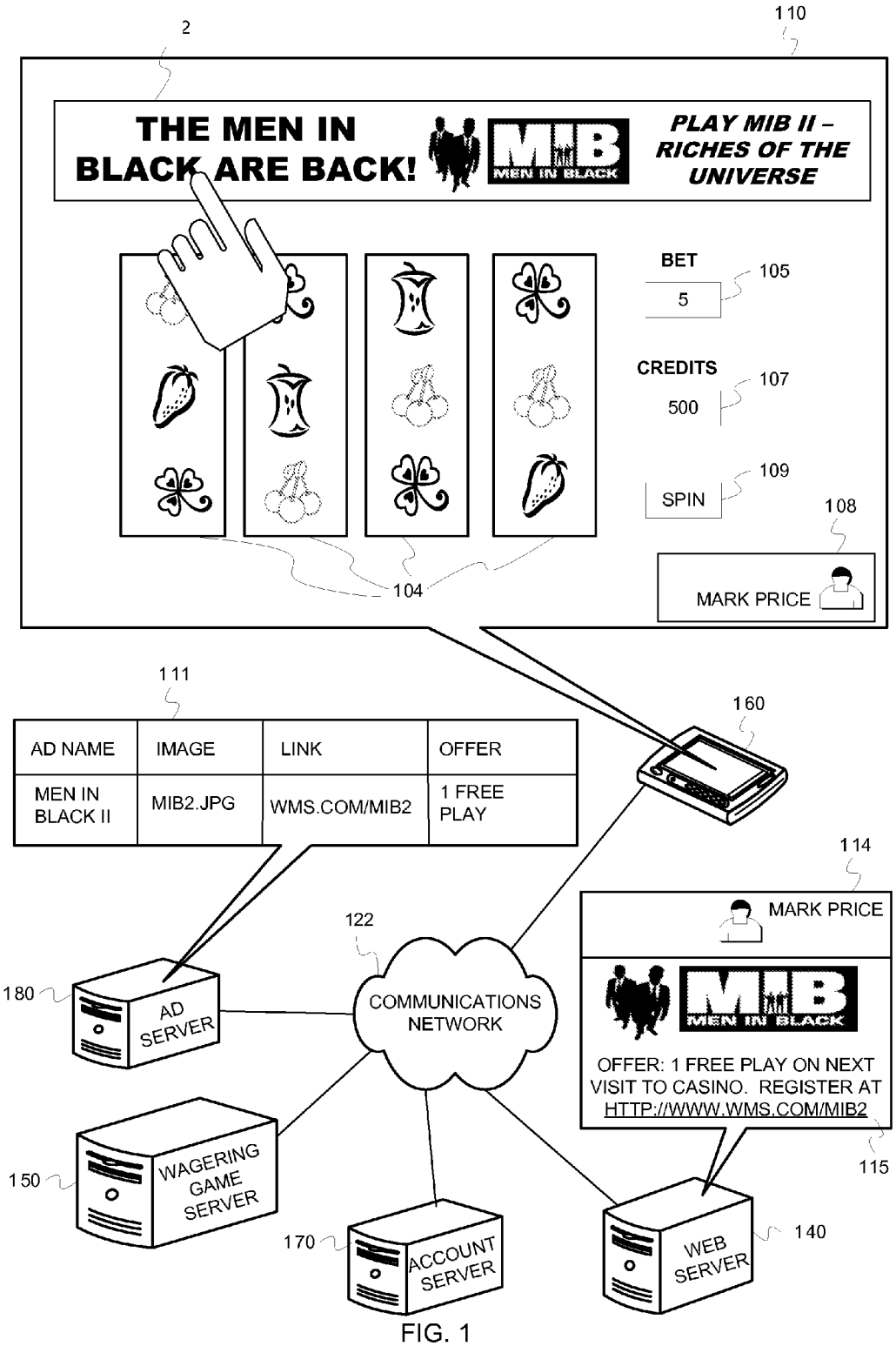
FIG. 1 is an illustration of selecting casino content and saving it in a user accessible storage, according to some embodiments.

Casinos provide various types of casino content to casino users. Some of that casino content relates to wagering games ("wagering game casino content"), such as wagering games, account information related to games, advertisements for games, congratulatory displays for winning games, etc. Some of the casino content relates to information other than wagering games ("non-wagering game casino content") such as messages related to products or services offered in the casino (e.g., promotions for merchandise, food advertisements, messages about upcoming events, shows, concerts, etc.), as well as messages related other things, such as communications from other patrons (e.g., chat sessions, shared files, etc.), third party advertisements (e.g., non-casino ads), television broadcasts, and so forth. Casinos are interested in making casino users, such as wagering game players ("players") and other types of casino patrons, aware of the wagering game casino content and the non-wagering game casino content (collectively, the "casino content"). The casinos present the casino content on various electronic devices ("devices") positioned throughout the casino, such as on wall-mounted screens, on electronic billboards, on television monitors, on projection screens, on computers, on wagering game machines, etc. Casinos often present casino content on devices that are within reach or in close proximity to casino users. For instance, casinos will often present non-wagering game casino content on displays, speakers, etc. that are a part of, and/or in proximity to, wagering game machines as the wagering game machines are presenting wagering game casino content. The casinos know that casino users will very likely see the non-wagering game casino content when it is presented on, or close to, a wagering game machine, because the casino user may be looking at, or around, the wagering game machine for long periods of time during game play sessions. Casinos, however, face certain challenges by presenting non-wagering game casino content in close proximity to wagering game casino content. For example, when a patron is playing a wagering game, the casino makes money on the patron's losses. The more games that the patron plays, the more money the casino may make. Therefore, the casinos face a conflict with presenting non-wagering game casino content in close proximity to wagering game casino content because although casino users such as patrons are very likely to see or hear the non-wagering game casino content if it is in close proximity to a the wagering game casino content, the casinos also want patrons to continue playing wagering games without being unduly distracted by non-wagering game casino content or anything else that may hinder or slow down the speed of play. Embodiments of the inventive subject matter, however, provide ways for casinos to present non-wagering game casino content in close proximity to wagering game casino content while still allowing the casino user to focus primarily on the wagering game casino content. For example, FIG. 1 shows a wagering game system 100 that provides a way for an individual to select interesting casino content and save the casino content so that the individual can review it later. Thus, patrons, players, and the like can focus primarily on wagering games, but also save interesting casino content for later review. In some embodiments, like in FIGS. 4 and 6, a wagering game system also provides ways for an individual to capture or collect casino content (including wagering game casino content) and store it for later review. The embodiments also describe ways to analyze the selections and/or use stored preferences in user accounts to generate interesting casino content that the wagering game system can present within the casino or via accounts associated with the account user.

Figure 4:
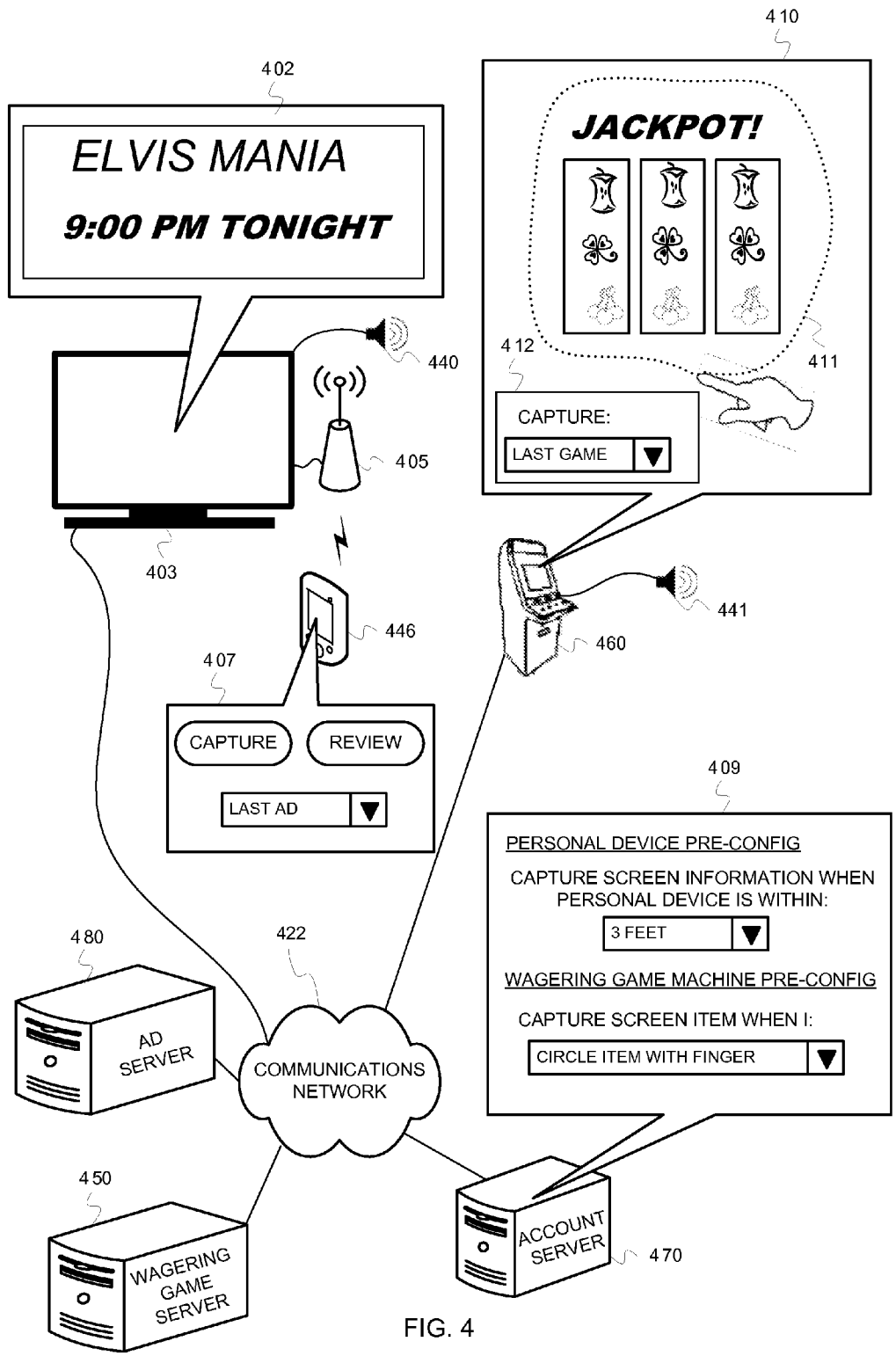
FIG. 4 is an illustration of collecting casino content, according to some embodiments.
Figure 6:
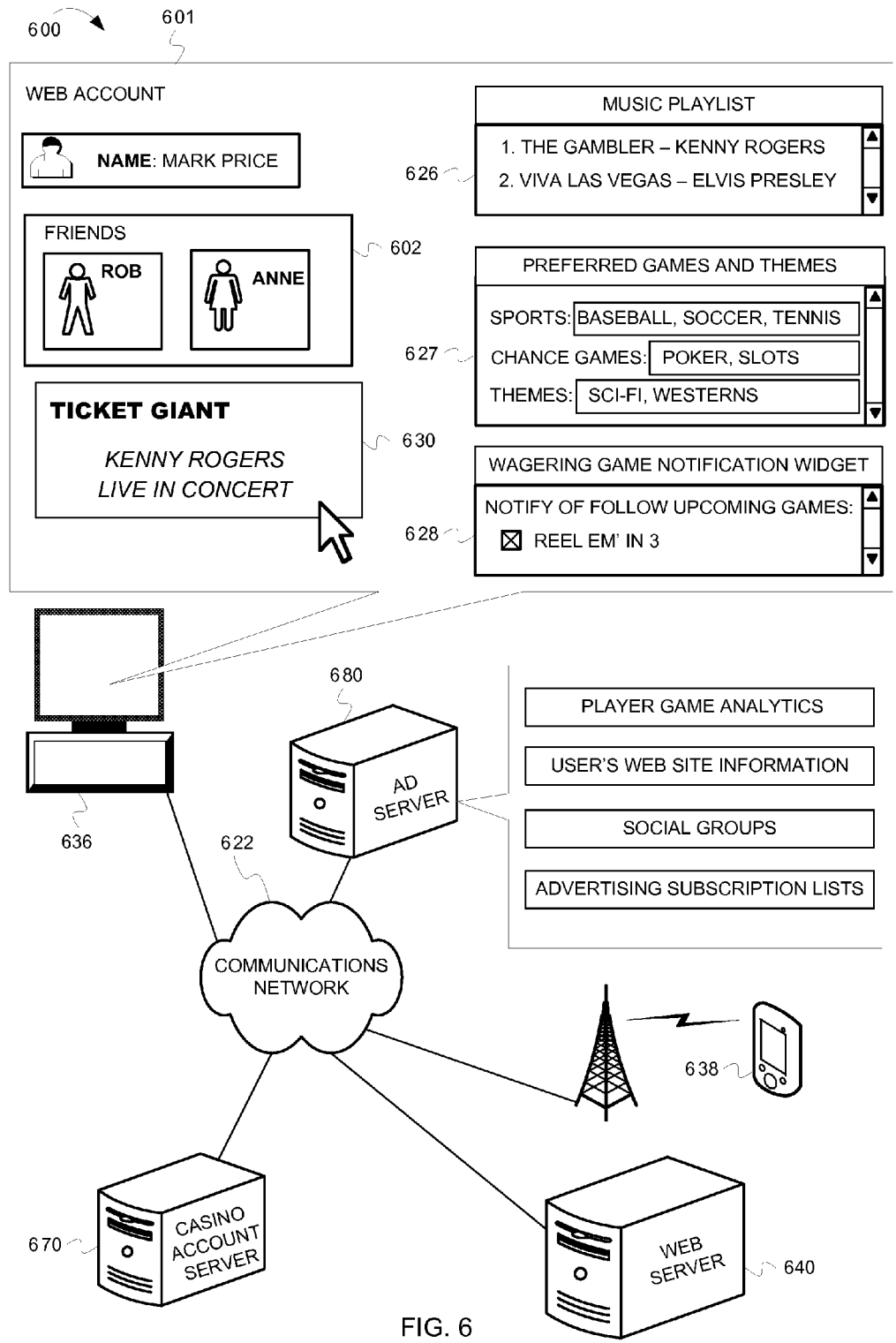
FIG. 6 is an illustration of presenting casino content using a user account, according to some embodiments.

FIG. 1 is a conceptual diagram that illustrates an example of selecting casino content and saving it in a user accessible storage, according to some embodiments. In FIG. 1, a wagering game system ("system") 100 includes a wagering game machine 160 connected to a communications network 122. Also connected to the communications network 122 are a wagering game server 150, a web server 140, an account server 170, and an advertisement ("ad") server 180. The wagering game machine 160 includes a display 110 that presents various images, controls, meters, etc. associated with a wagering game session. For example, the display 110 presents wagering game content, such as slot reels 104 that present a wagering game outcome. In some embodiments the wagering game server 150 can provide the wagering game content and outcome to the wagering game machine 160. The display 110 also presents a bet meter 105 to track and control betting on the wagering game and a spin control 109 to spin the slot reels 104. The display 110 also presents a credit meter 107 to track an amount of credits won during a wagering game session, and a panel 108 to present all types of information and functions (e.g., information about a casino user that is logged in to the wagering game machine 160 via a wagering game account, information about financial transactions, promotions, chat messages, console buttons, etc.). The panel 108 can resize to fit content and can move around the display 110. The wagering game account can be stored in the account server 170 that stores information related to the casino user, the casino user's wagering activities, financial transactions, etc. The account server 170 can also store information about other accounts (e.g., a web account, a social network account, etc.) in addition to, instead of, or in conjunction with, a wagering game account. Slot games are one example of wagering games that can be played on the wagering game machine 160. The wagering game machine 160, however, can be used to present a variety of different wagering games (e.g., video poker, blackjack, bingo, group games, bonus games, progressive games, etc.). The wagering game machine 160 can also be used for other casino services and/or non-wagering game activities, such as for ordering drinks, receiving messages about casino events, chatting with patrons, communicating with technicians, surfing the internet, playing non-wagering games, receiving news feeds related to casino content, patron information, and/or promotions, etc. The wagering game machine 160 can also be used to receive advertisements ("ads"), such as the promotion 112 promoting a new wagering game that is available on the casino network. In some embodiments, the display 110 may be presented on a peripheral device (e.g., a display monitor) connected to a docking station at which the wagering game machine 160 is docked. Consequently, in some embodiments, the promotion 112 can be presented on the peripheral device. During a wagering game session, the casino user may want to focus on playing wagering games instead of looking at ads. Nevertheless, the casino user may be interested in a promotion 112 and want to review it later. Consequently, the system 100 presents the promotion 112 as a selectable and savable advertisement, or rather, an advertisement that can be selected in some way by the casino user, and saved, in some form, to one or more storage locations that are accessible by the casino user (e.g., a personal storage device, a website account, a wagering game account, a cell phone, a laptop, a local storage device provided by the casino, a web account, a shared account, etc.). The one or more storage locations may be referred to as "user accessible storages" or "content-storage" locations because the storage locations can be accessible to the casino user for saving and/or retrieving the casino content. Other examples, such as in FIGS. 4 and 6 illustrate how casino users can store casino content that they find interesting or important. The one or more user accessible storages do not have to be owned by the casino user, but are "accessible" by the casino user for storing and retrieving information (e.g., the casino user has user rights to save the casino content, read the casino content, etc.). User accessible storages are not confined solely to devices or accounts associated with a casino's private network, but can extend beyond the casino's private network to other networks and locations that are accessible from within the casino, such as the Internet, a cell phone network, a wide area network, etc. The promotion 112 can have information associated with it. The ad server 180 can include a record 111 containing advertising information for the promotion 112. The advertising information can include an ad name or identifier, an ad image, a link, a patron offer, and other information (e.g., terms of a deal) that can be used to present the promotion 112 on the display 110 and also to store the promotion 112 in the user accessible storage. The promotion 112 can be selectable. For example, the casino user can touch a screen displaying the promotion 112. When touched, the promotion 112 can present a pop-up message prompting the casino user to select where to store the promotion 112 (e.g., prompt for an email address, prompt for a device selector, etc.). To save time, however, the casino user can pre-configure what happens when the promotion 112 is selected by storing pre-configuration information in the account server 170 (see FIG. 4 for more details). After the promotion 112 is selected, the system 100 can package the ad information into a transportable package, file, etc., (e.g., an email, a text message, a data packet, a multi-media presentation, a web animation, an electronic document, a web page, a configuration file, a command, etc.). The system 100 can send the advertisement information to the casino user's storage, along with any commands needed to store the ad information in memory (e.g., data writing commands). The system 100 can package the promotion 112 exactly as it appears on the display 110 and send the exact replica of the promotion 112 to the user accessible storage. On the other hand, the system 100 can modify how the promotion 112 looks (e.g., alters the size based on the size of a display) or behaves and can also add other information that is only included in the transferrable package that wasn't presented on the promotion 112 (e.g., a website link, an offer, patron information, wagering game information, financial account information, etc.). For example, the system 100 can detect that a casino user touches the promotion 112 and package some of the images presented on the promotion 112 into a message 115 that the system 100 sends to a web account 114 belonging to the casino user. The web account 114 can be stored on the web server 140. The web account 114 receives the message 115 and stores it. The casino user can then access the web account 114 at a later time and review the message 115.

The system 100 can save and store any information presented on the display 110, not just information presented on the promotion 112. For example, the system 100 can save and store congratulatory animations, game results (e.g., wins, impressive hands, etc.), wagering game images, re-enactments of what occurs during a wagering game, demonstrations of new games, chat conversations, replays, prior news feeds related to casino content, etc. The system 100 can also work with other devices within a casino network, not just the wagering game machine 160. For example, the system 100 can present selectable and savable casino content on electronic signs displayed on monitors within a casino, on television channels on a casino television set, etc.

Although FIG. 1 describes some embodiments, the following sections describe many other features and embodiments.

Example Operating Environments

This section describes example operating environments and networks and presents structural aspects of some embodiments. More specifically, this section includes discussion about wagering game system architectures.

Wagering Game System Architecture

Figure 2:
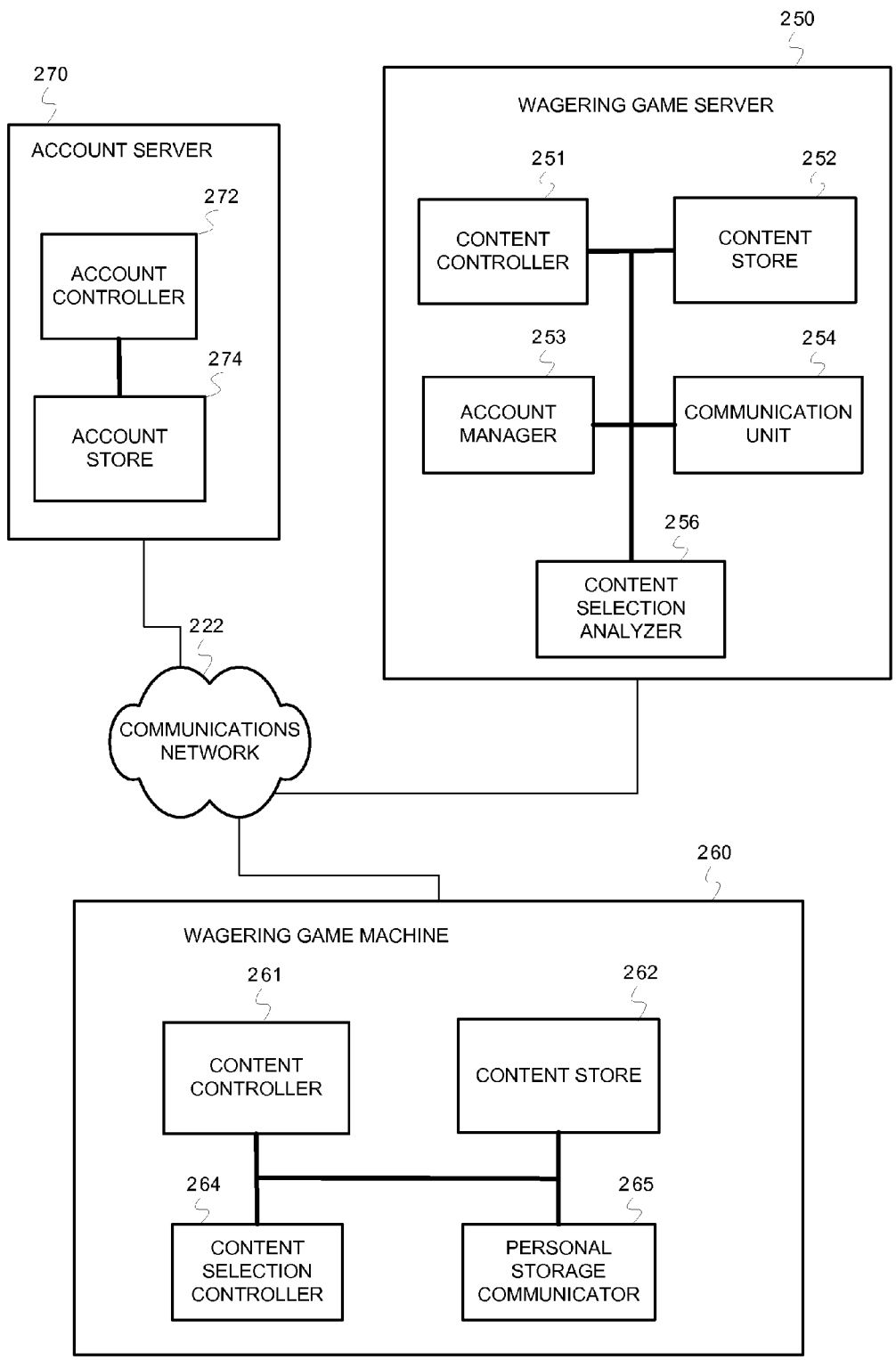
FIG. 2 is an illustration of a wagering game system architecture 200, according to some embodiments.

FIG. 2 is a conceptual diagram that illustrates an example of a wagering game system architecture 200, according to some embodiments. The wagering game system architecture 200 can include an account server 270 configured to control user related accounts accessible via wagering game networks and social networks. The account server 270 can store and track user information, such as identifying information (e.g., avatars, screen name, account identification numbers, virtual assets, identifier information, virtual awards, other awards, etc.) or other information like financial account information, social contact information (e.g., archived chat communications with social contacts, names and contact information for social contacts, etc.), etc. The account server 270 can contain accounts for social contacts referenced by the user account. The account server 270 can also provide auditing capabilities, according to regulatory rules, and track the performance of users, machines, and servers. The account server 270 can include an account controller 272 configured to control information for a user's account. The account server 270 can also include an account store 274 configured to store information for a user's account.

The wagering game system architecture 200 can also include a wagering game server 250 configured to control wagering game content and communicate wagering game information, account information, and other information to and from a wagering game machine 260. The wagering game server 250 can include a content controller 251 configured to manage and control content for the presentation of content on the wagering game machine 260 or other casino devices. For example, the content controller 251 can generate game results (e.g., win/loss values), including win amounts, for games played on the wagering game machine 260. The content controller 251 can communicate the game results to the wagering game machine 260 via a communications network 222. The content controller 251 can also generate random numbers and provide them to the wagering game machine 260 so that the wagering game machine 260 can generate game results. The content controller 251 can also present casino content, determine selections of content, gather content and metadata, and package content and metadata into one or more transportable electronic packages, files, instructions, etc. The wagering game server 250 can also include a content store 252 configured to contain content to present on the wagering game machine 260. The content store 252 can include casino content that is selectable and savable to a user accessible storage. The wagering game server 250 can also include an account manager 253 configured to control information related to user accounts. For example, the account manager 253 can communicate wager amounts, game results amounts (e.g., win amounts), bonus game amounts, etc., to the account server 270. The wagering game server 250 can also include a communication unit 254 configured to communicate information to the wagering game machine 260 and to communicate with other systems, devices and networks on the communications network 222. The wagering game server 250 can also include a content selection analyzer 256 configured to analyze content selection history, user account information, patron history, external account information, etc. and generate analytic information ("analytics"). The content selection analyzer 256 can also determine predictive analytics based on an individual's past behavior and/or by addressing a group behavior that shares characteristics with an individual. The casino content controller 255 can use the analytics to determine (e.g., select, generate, predict, etc.) casino content to present to a casino user and/or to present on accounts associated with the casino user.

The wagering game system architecture 200 can also include a wagering game machine 260 configured to present wagering games and receive and transmit information to store and use casino content. The wagering game machine 260 can include a content controller 261 configured to manage and control content and presentation of content on the wagering game machine 260. The wagering game machine 260 can also include a content store 262 configured to contain content to present on the wagering game machine 260. The wagering game machine 260 can also include a content selection controller 264 configured to determine that a casino user (e.g., a player, a casino patron, a casino staff, a friend or relative of a casino patron, a social contact, etc.) has selected a selectable casino content item. The content selection controller 264 can determine various ways that a casino user may select items. For example, as shown in FIG. 6, the content selection controller 264 can detect a hand motion (e.g., a finger swipe, a tap, etc.) on a touch screen. Alternatively, the content selection controller 264 can detect when a casino user or casino user's personal device is within a pre-determined distance (e.g., within a wireless signal range) of a casino display and save information presented on the display to the casino user's account and/or to the personal device (see FIG. 6). The content selection controller 264 can also automatically detect pre-configurations set by a casino user regarding content that the casino user would like to select and store (see FIG. 6). The content selection controller 264 can also gather information about the selected content (e.g., movie files, picture files, links, descriptions, pre-set messages, associated discounts, Internet websites, etc.). The content selection controller 264 can present that information to the content controller 251 or the content controller 261, for packaging. The content selection controller 264 can present the packaged content to a personal storage communicator 265. The personal storage communicator 265 can be configured to receive content from the content selection controller 264, the wagering game server 250, or other sources, and send the information to a user accessible storage associated with the casino user.

Each component shown in the wagering game system architecture 200 is shown as a separate and distinct element. However, some functions performed by one component could be performed by other components. For example, the content controller 251 and the content controller 261 can both package information associated with selected casino content items. Furthermore, the components shown may all be contained in one device, but some, or all, may be included in, or performed by multiple devices, as in the configurations shown in FIG. 2 or other configurations not shown. Furthermore, the wagering game system architecture 200 can be implemented as software, hardware, any combination thereof, or other forms of embodiments not listed. For example, any of the network components (e.g., the wagering game machines, servers, etc.) can include hardware and machine-readable content including instructions for performing the operations described herein. Machine-readable content includes any mechanism that provides (i.e., stores and/or transmits) information in a form readable by a machine (e.g., a wagering game machine, computer, etc.). For example, tangible machine-readable content includes read only memory (ROM), random access memory (RAM), magnetic disk storage content, optical storage content, flash memory machines, etc. Machine-readable content also includes any content suitable for transmitting software over a network.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable content (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 3:
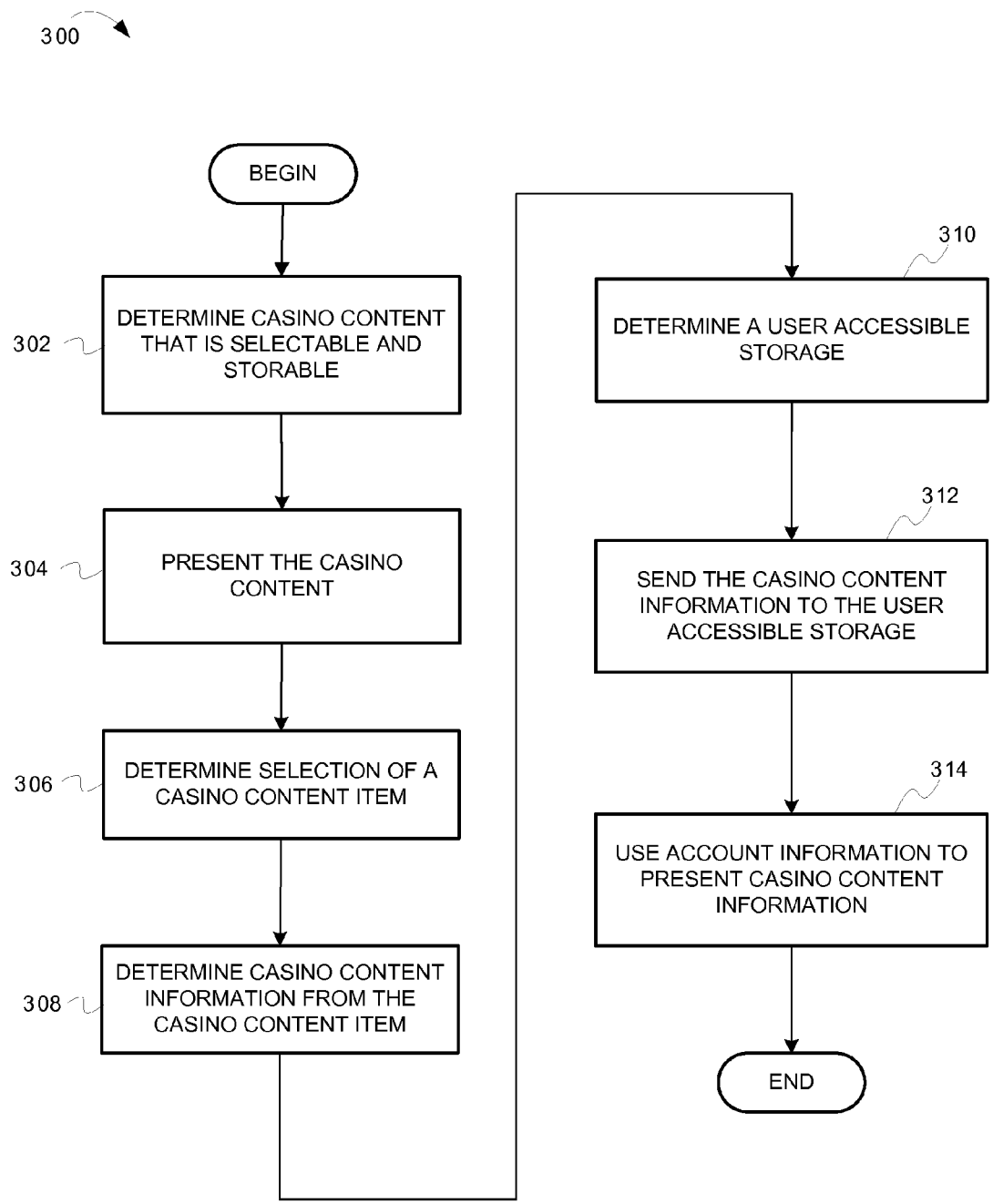
FIG. 3 is a flow diagram 300 illustrating determining selections of casino content and sending the content to a user accessible storage, according to some embodiments.

FIG. 3 is a flow diagram illustrating determining selections of casino content and sending the content to a user accessible storage, according to some embodiments. FIGS. 1, 4, and 6 are conceptual diagrams that help illustrate elements of a flow 300 in FIG. 3, according to some embodiments. This description will present FIG. 3 in concert with FIGS. 1, 4, and 6. In FIG. 3, the flow 300 begins at processing block 302, where a wagering game system ("system") determines casino content that is selectable and storable. The system can determine all types of selectable and storable casino content ("casino content items"), such as visible graphics, text, sounds, music files, movie files, animations, etc. The system can generate casino content items with properties, controls, or other elements that can detect when one or more casino content items are selected. The casino content items can include perceptible data (e.g., images displayed on a device, sounds presented via speakers, etc.) and metadata (e.g., data stored in a database). The perceptible data and metadata can be associated with the casino content item so that when the casino content item is selected, the system can react with one or more different responses that gather some or all of the perceptible data and metadata and send it to a user accessible storage.

The flow 300 continues at processing block 304, where the system presents the casino content. The system can present the casino content on wagering game machines, monitors, wall displays, speakers, etc. In some embodiments, the wagering game machine may be a standing model wagering game machine. The standing model wagering game machine can have multiple displays build into it, such as peripheral devices, box-top monitors, etc., that can also display casino content. In some embodiments, the wagering game machine can be a mobile wagering game machine. The mobile wagering game machine can be docked at a docking station. The docking station can expand the viewing area of a wagering game machine by having one or more peripheral displays attached to the docking station. The peripheral displays can have the same capabilities to present the casino content as the wagering game machine. A casino user can be logged in to a wagering game session on the wagering game machine. The docking station can recognize the casino user's identity via the docked wagering game machine and detect pre-configurations associated with the casino user's selection of objects.

The flow 300 continues at processing block 306, where the system determines a selection of a casino content item. The system can detect various ways that a casino user and/or device might select a casino content item. For example, in FIG. 1, the system 100 detects that a casino user touches a casino content item on a screen of a wagering game machine 160. FIG. 4 illustrates two other examples of ways that the system can detect when a casino user selects casino content items, for instance by, (1) detecting a circular finger motion on a touch-screen and (2) detecting that a casino user device is within a wireless range of a casino display. In FIG. 4, a wagering game system ("system") 400 includes multiple casino display devices, such as a wagering game machine 460 and a casino display 403. The casino display 403 can cycle messages and ads for casino events, games, services, products, and activities. The casino display 403 can also present ads for non-casino services and products by advertisers that want to market to players, casino patrons, and other casino users. The ads presented on the casino display 403 can include selectable and savable casino content items. The wagering game machine 460 can also present casino content items. For instance, a display 410 on the wagering game machine 460 presents a congratulatory display of a wagering game win. The wagering game machine 460 and the casino display 403 can receive the casino content from a wagering game server 450 and/or an ad server 480. The wagering game server 450, the ad server 480, the casino display 403 and the wagering game machine 460 are connected via a communications network 422. A casino user can select a casino content item ("item") on the display 410 by touching a touch-screen on the display 410 and making a circular motion around one or more items. The wagering game machine 460 detects the motion which creates a boundary 411 around the encircled items. The wagering game machine 460 can then determine that any items within the boundary 411 are selected items. The system 400 can read from a pre-configured, content selection configuration setting ("pre-configuration setting") 409. The pre-configuration setting 409 can be stored in a user account on an account server 470. The system 400 can use the pre-configuration setting 409 to determine that a circular finger motion on a touch-screen is an action that selects items. The wagering game machine 460 can read properties of the selected items and, based on the object's properties, present a prompt 412 that prompts the casino user for additional options. For example, if a casino user selects an item that changes periodically, the system 400 may want additional assistance from the casino user to indicate whether the system 400 has correctly selected the proper item, as the item may have changed during the selection. Further, the system 400 may give options to select a history of items that have changed, such as certain number of games (e.g., the last game, the last two games, etc.). Further, the nature of the items may be different, and have different properties. For example, a casino user may select or highlight several items and the system 400 may prompt the casino user to indicate whether the casino user wants all of the objects selected as a single item or as individual items. The prompt 412 can also provide an option to crop or resize the selection. In addition to selecting items with a touch-screen on the display 410, a casino user can also select objects by activating a user accessible storage device and/or moving the user accessible storage device within a wireless range of the casino display 403. The casino display 403 can have a wireless transceiver 405 that can detect and send wireless signals. A personal device 446 may also have wireless capabilities. When a casino user sees casino content, such as an ad 402, the casino user can move within wireless range to initiate a selection process. The personal device 446 may be equipped with software that can interface with the wireless transceiver 405 and present a selection panel 407 indicating options for selecting the ad 402. The selection panel 407 can include options for selecting (e.g., capturing) one or more items that were displayed on the casino display 403. The pre-configuration settings 409 can also indicate, in advance, selection configurations (e.g., how far away the personal device should be to the casino display 403 to activate the selection process). The pre-configuration settings 409 can also have an on/off setting so that selection functionality can be turned on or off Casinos may also provide devices that can be configured to interface with casino displays in different ways to indicate a selection of a casino content item. For example, a casino may provide casino patrons with devices that are equipped with laser pointers to point at casino displays and highlight selectable items. Some displays can also be equipped with touch screens, like the touch-screen on the wagering game machine 460, so that casino users can touch the casino displays and select items using finger or hand motions. Devices can use radio-frequency identification (RFID) devices, motion detectors, optical transmitters, video transmitters, tactile devices, text recognition devices, speech recognition devices, and other devices to select and communicate casino content. Some devices have a direct, or wired, connection to each other (e.g., the personal device 446 can connect to the casino display 403 via an input/output port). The system 400 can also provide pop-ups or other prompts that take notes about a casino user's desires concerning the content. For example, the prompt 412 and the selection panel 407 can include a section for notes (e.g., to indicate a web-address, to select one or more user accessible storage devices, to indicate how the content should be packaged, to indicate a cell phone to send the information to, to indicate friends that should receive the content, to provide instructions to an intermediary recipient of the content, etc.). In some embodiments, the system 400 may also select non-viewable casino content items. For instance, the wagering game machine 460 and the casino display 403 may include speakers 440, 441 that present sounds, music, etc. The system 400 can present a sounds selection interface that can display sound files describing recently played sounds (e.g., game theme music, a congratulatory sound, etc.). A casino user can select the desired sound files from the sounds selection interface.

The flow 300 continues at processing block 308, where the system determines casino content information from the casino content item. Some casino content information can be perceptible (e.g., graphics, pictures, text, video, audio, etc.). Other information can be metadata associated with the item. The metadata can be pre-stored to place into messages, content packages, etc. that are sent to user accessible storage locations. The system can determine the information from the selected items by reading properties and settings of the items or by reading data stored in a database associated with the items. The system can then prepare the data to be transferred to a user accessible storage, such as by packaging data from portions of a database record, as well as any associated graphics, videos, sound files, etc., the into a transportable package. In some embodiments, the system can select or generate a reproduction of the item (e.g., a casino user selects one or more graphics and the system packages a copy of the graphics exactly as they appear to the casino user). However, some items, though they may appear as a cohesive unit to the casino user may actually be a group of separable items that the system can separate and repackage to appear different than what the casino user sees. The system can provide prompts and/or settings that allow a casino user to indicate whether the casino user wants to receive an exact copy or whether the system can repackage the information in another way that may be more appealing, that may store more easily, that can be displayed on specific technology different than the casino display, etc.

The flow 300 continues at processing block 310, where the system determines a user accessible storage. A user accessible storage can be a personal device (e.g., a cell phone, a personal digital assistant, a personal database, a flash card, a personal computer, an external hard drive, etc.) that the casino user carries or possesses. The system can detect one or more devices connected to, or in proximity to, the casino display device and prompt the casino user to indicate a storage location (e.g., select a device and a drive on the device). In some embodiments, a user accessible storage can be on a device that the casino user does not carry or possess, such as a storage space or account on a remote device (e.g., an account server, a web server, etc.).

The flow 300 continues at processing block 312, where the system sends the casino content information to the user accessible storage. The system can send the casino content information to a designated device or storage location. In some embodiments, the system can connect with a host device and initiate a command to save the information on a computer hard drive, a database, or some other file system or long-term (e.g., non-volatile) memory location. In some embodiments, the system can store the information in temporary memory (e.g., volatile memory, random access memory, etc.) on the device (e.g., the wagering game machine) that displayed the information. The casino user can review the casino content item information before the wagering game session ends and/or the machine power-cycles and flushes the casino content from the temporary memory. In some embodiments, the system can send a message containing the information, such as to an email account, which the host email server can store in the form of an email, a text message, a chat message, an archive file, etc. The system can provide storage commands and user login information, along with the casino content information, to a remote server, such as a web server. The web server can use the user login information to determine a web account associated with a player account, or other user account used to access the system. The web server can process the storage commands to determine a memory location associated with the web account and store the casino content information in the memory location.

Figure 5:
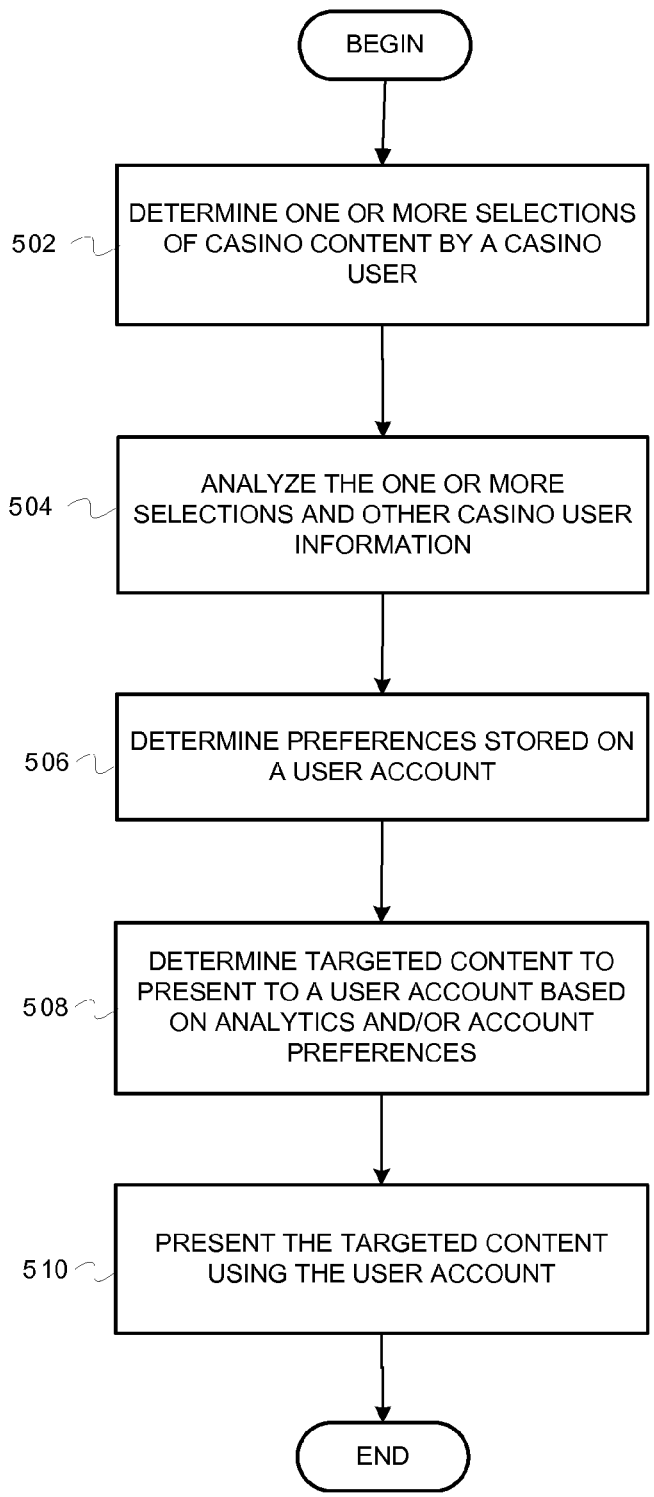
FIG. 5 is a flow diagram 500 illustrating analyzing casino user selections history, and other casino user information, to present targeted casino content, according to some embodiments.

The flow 300 continues at processing block 314, where the system uses account information to present the casino content information. The system can present the casino content information (e.g., copies of the selected casino content items and/or other data) on a player profile, on a user account, on an email message, on a chat screen, or any other device or display that can access the user accessible storage to which the casino content information was sent and stored. FIG. 1 illustrates and example of presenting saved and stored casino content. In FIG. 1, the web account 114 displays a message showing information from the saved promotion 112. FIG. 6 illustrates an example of a web account with additional features that can further present the saved casino content information. In FIG. 6, a wagering game system ("system") 600 includes a personal computer 636 that a user can use (e.g., external to a casino network) to access a web account hosted by a web server 640. The computer 636 includes a display 601 that shows account information for the web account that belongs to the user. The user may have selected casino content from a casino device and stored the casino content to the web account. The user can log on to the web account using the computer 636, which connects to the web server 640 via the communications network 622. The computer 636 can access the casino content that was stored on the web account and display it within the computer display 601. In some embodiments, the system 600 can use information from the web account to present the information. For instance, the web account includes information about social contacts 602 (e.g., friends, acquaintances, etc.) of the user. The system 600 can send the casino content information to one or more of the social contacts associated with the user. The system 600 can send the packaged casino content information to any designated account, cell phone, web page, or other device and/or location that belongs to the social contact, such as to a social contact's mobile device 638. In some embodiments, the system 600 can determine groupings of social contacts based on information provided on the user account. For instance, the social contacts 602 may include tags, properties, or other descriptors that indicate that some of the social contacts may like various types of wagering game content and would like to receive a copy of the saved casino content. In some embodiments, the system 600 can present controls and functionality that allows a user to modify or edit the information. For example, the system can show the user what was stored from the casino, but then modify it (e.g., resize it, reshape it, record over portions of it, personalize it, etc.). The system 600 can pre-configure a casino content item with modification options to assist the user in easily modifying and edit the stored casino content. The system 600 can also convert the casino content to different file formats so that the casino content can be opened and modified with third-party applications. In some embodiments, the system can read preferences from the web account and use the preferences to determine targeted casino content that the system 600 can present to the user when the user is logged in to the web account. FIG. 5 illustrates an example flow 500 that can determine and provide targeted content.

FIG. 5 is a flow diagram illustrating analyzing casino user selections history, and other casino user information, to present targeted casino content, according to some embodiments. FIG. 6 is a conceptual diagram that helps illustrate elements of a flow 500 in FIG. 5, according to some embodiments. This description will present FIG. 5 in concert with FIG. 6. In FIG. 5, the flow 500 begins at processing block 502, where a wagering game system ("system") determines one or more selections of casino content. The system can determine selection of casino content as described in FIG. 3.

The flow 500 continues at processing block 504, where the system analyzes the one or more selections and other casino user information. As a casino user selects casino content items ("items") to save and store, the system can analyze those items and generate analytical information ("analytics") based on the casino user's history of selecting items. The items can have descriptive metadata (e.g., properties, tags, etc.) that indicate the nature of the items (e.g., ad types, related game themes, etc.). The system can also provide information related to the presentation of the items (e.g., demographics, time and date presented, content provider, etc.). For example, a casino user may consistently select and save items related to casino musical shows and events. Those items may have metadata tags that identify the items as belonging to a "musical" category. The system can use that information to determine musical ads with some musical properties and target the casino user with the musical ads (e.g., show ads related to musical events, show ads with rich musical sound tracks, etc.). The system can generate and/or access analytics from an advertising server. For instance, in FIG. 6, an ad server 680 can generate and store the analytics. The ad server 680 can access a casino account server 670, via the communication network 622, to obtain a casino user's selection history and analyze it to generate the analytics.

The flow 500 continues at processing block 506, where the system determines preferences stored on a user account. For example, in FIG. 6, the system 600 can access the web account hosted by the account server 640. The web account can include various preferences set by the user, such as a music play list 626 indicating music that the user enjoys, a preferred games and themes panel 627 indicating favorite games, sports, movie genres, and a wagering game notification widget 628 indicating types of wagering games that the user would like to be notified about. The ad server 680 can access the web server 640, via the communication network 622, to obtain user preferences. The ad server 680 can also access user preferences on other accounts that store user preferences, such as the casino account server 670.

The flow 500 continues at processing block 508, where the system determines targeted content to present to a user account based on analytics and/or account preferences. For example, in FIG. 6, the system 600 can use any of the preferences (e.g., music play list 626, preferred games and themes panel 627, wagering game notification widget 628, etc.) and the user analytics (e.g., a user's preference for musical casino content based on user selection history) to determine targeted casino content. The system can also provide the analytics to third parties to target market their services and products (e.g., musical CDs, concert tickets, etc.) to the user.

The flow 500 continues at processing block 510, where the system presents the targeted content using the user account. For example, in FIG. 6, the system 600 presents a targeted ad in the ad banner box 630, when the web account is active (e.g., when the user is logged on and/or using the web account). For instance, the system 600 determines, based on the user's selection history, that the user likes musical events. Further, the system 600 determines, from the music play list 626 that the user likes a certain performing artist. The ad server 680 then searches through listings for musical concerts that may be playing in a location close to the user's residence, in a local casino, etc. The system 600 then presents the ad in the ad banner box 630. The system 600 can also search through other servers of advertising partners to find content to present in the ad banner box 630. In some embodiments, the system 600 can present saved content that relates most closely to the user's likes based on the user selection history and/or user preferences. For example, if the user had selected several items from casino devices, including an ad for the performing artist when it was presented on a casino display device, the system 600 may present the ad for the performing artist first, or more frequently, than other selected and saved items. In other embodiments, the system 600 can send reminders to a user, based on the selections, to remind the user about new games that the user has tagged. For example, the system can read a preference about a new game from the wagering game notification widget 628, or other games that are related to the new games. The system 600 can also detect a selection of a game from a casino display device and send commands along with the packaged information from the casino content item. The commands can update the settings on part of the web account 601, such as settings within the wagering game notification widget 628.

Figure 7:
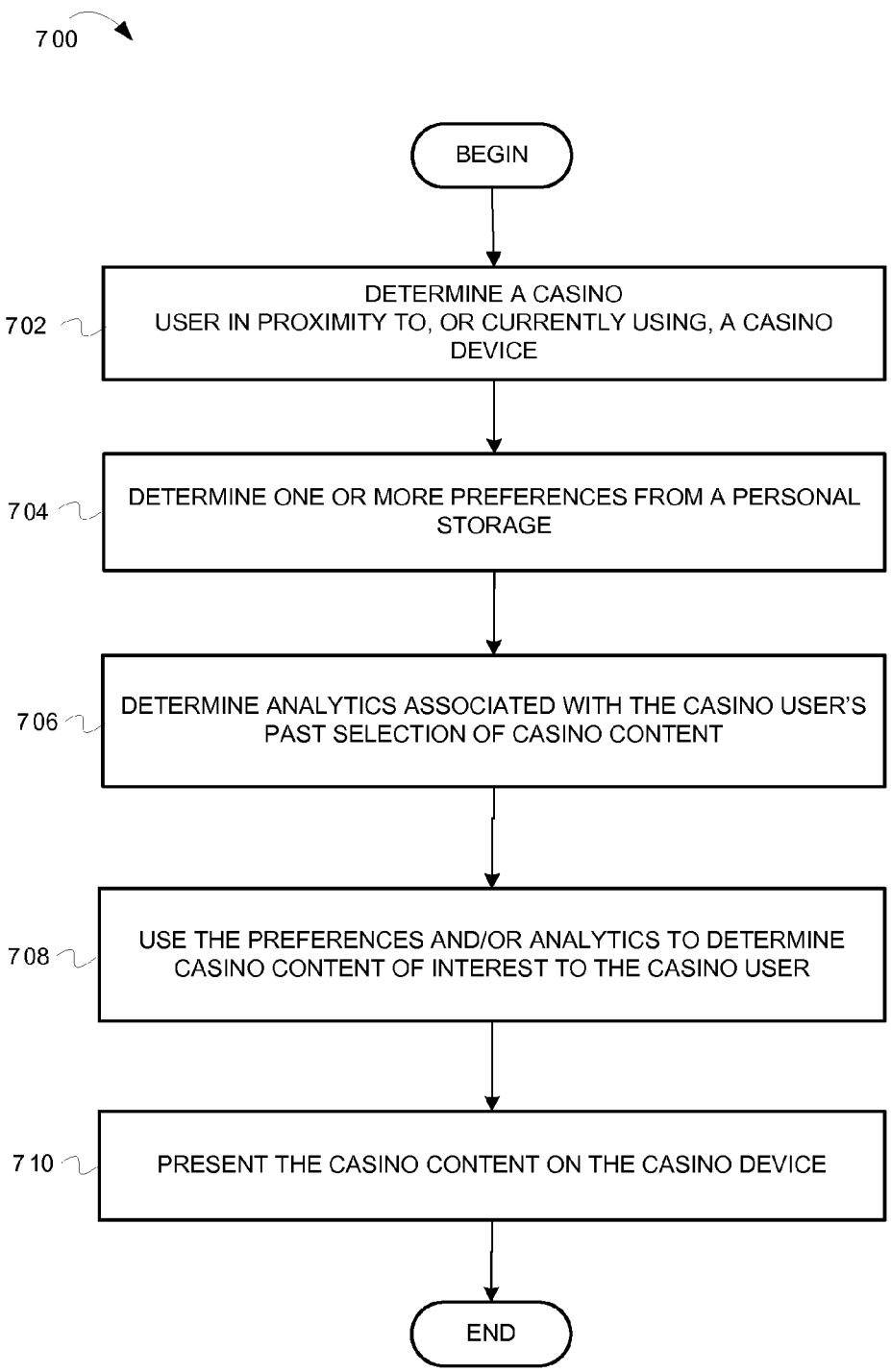
FIG. 7 is a flow diagram 700 illustrating using information from a user accessible storage to determine casino content to present to a user, according to some embodiments.

In some embodiments, a wagering game system can also use analytics and preferences to present casino content on a casino device. For example, in FIG. 7 a flow 700 illustrates using information from a user accessible storage to determine casino content to present to a casino user, according to some embodiments. In FIG. 7, the flow 700 begins at processing block 702, where a wagering game system ("system") determines a casino user in proximity to, or currently using, a casino device. For instance, in FIG. 4, a casino user may be carrying the personal device 446 and may approach the casino display 403. In some embodiments, the wireless transceiver 405 detects, via an RFID transmitter, a player account card, chip, or other identification device that a specific user account uses for the personal device 446. In other embodiments, the wireless transceiver 405 can read identifying information stored on the personal device 446, such as a user's name, and then cross-reference a user account list to find a user account with the same name. In some embodiments, the personal device 446 may be a mobile wagering game machine, or other mobile device, that has been registered to the user account.

The flow 700 continues at processing block 704, where the system determines one or more preferences from a personal storage. For example, in FIG. 4, the wireless transceiver 405 can detect preferences stored on the personal device 446 indicating ads or other casino content that the user has previously selected. The wireless transceiver 405 can also communicate with the account server 470, the ad server 480, or any other device (e.g., a remote web server) to determine preferences from a user account.

The flow 700 continues at processing block 706, where the system determines analytics associated with the casino user's past selection of casino content items. The system can determine analytics associated with the user account as described in FIG. 5. For example, in FIG. 6, the system 600 can obtain analytics from the ad server 680, which generates and/or stores player game analytics, along with other kinds of information related to the user's game history, selection history, social group rankings, etc.

The flow 700 continues at processing block 708, where the system uses the preferences and/or analytics to determine casino content of interest to the casino user. The casino content can be ads (e.g., ad items stored in an advertising server) that match some of the same properties, tags, descriptions, or other information that is similar to the preferences and/or analytics. In some embodiments, the system can also determine non-casino content items of interest, such as ads from other advertisers that want to market to casino users. The system can determine the casino content by predicting what a casino user may like based on the information from the preferences and analytics.

The flow 700 continues at processing block 710, where the system presents the casino content on the casino device. For example, in FIG. 4, the system 400 detects that the casino user device 446 is close to the casino display 403 (e.g., within the pre-configured distance stored in the pre-configuration setting 409) and presents a targeted ad (e.g., ad 402) on the casino display 403. The system 400 can also present targeted casino content on the wagering game machine 460, when a user account is active (e.g., the player is logged in and/or using the wagering game machine 460). In some embodiments, the targeted casino content can be sounds or images of things that the casino user prefers. For example, the system can detect a song that the casino user likes by looking at user's account (e.g., "Viva Las Vegas" by Elvis Presley, as listed on the music play list 626 in FIG. 6). The system can play the song to entice the casino user to play wagering games for a longer duration. The system can also incorporate the song into casino content ads so that the ads become more appealing to the user.

Furthermore, although flow 700 describes determining a user account, the system can also determine information for an individual without actually determining a user account. For example, in FIG. 4, when the personal device 446 comes within a pre-configured proximity to the casino display 403, the system 400 can communicate with the personal device 446 and look for personal information (e.g., look at a specific file folder that is designated for casino content storage, look at a file folder that contains music files, etc.). The system can use the personal information to determine if it contains past casino content selections and/or preferences by the individual. The system can then use that information to determine casino content to present to the individual on a casino device. Further, the system can utilize guest, anonymous accounts, one-time accounts, shared accounts, etc. for individuals in a casino who have not registered for a casino account but that still want to save casino content.

Additional Example Embodiments

According to some embodiments, a wagering game system ("system") can provide various example devices, operations, etc., to store and use casino content. The following non-exhaustive list enumerates some possible embodiments.

The system can provide an icon on a television screen that a casino user can use to rate television channels, or an icon on a wagering game machine that a casino user can use to indicate preferences or ratings for wagering games. The system can save the ratings and preferences to a user account. The system can also augment settings based on the information. For example, the system can package commands that the account can use to update settings and configurations or store information in specific locations within the account's file structure.

The system can send saved casino content items to individuals or groups that a casino user does not know, but that may have common characteristics (e.g., system uses analytics to send items to users that have similar preferences or analytics).

The system can rank and/or organize groups based on the selection history of the individual in the group.

The system can prioritize casino content displayed on a casino display and/or on an account display, based on previous behavior, selections of items, etc.

The system can automatically select items to analyze during a wagering game. For example, the system can select wagering game play objects and use the data from the objects to grade a player and place the player into a level of competency.

The system can determine user preferences and integrate them into the casino content. The system can present personal content, such as an item that a user likes (e.g., a music file of a favorite song, a video clip of a favorite television show or movie, a picture of a friend or favorite celebrity, etc.) and require a user to meet a certain level of wagering game activity (e.g., play a certain number of wagering games) to continue presenting the item. The system can integrate the personal content into the wagering game elements (e.g., the system determines a favorite avatar or icon from a user preference and places it on a slot reel). The system can also detect selected and saved items and integrate those into game play elements (e.g., a user touches a color, texture, or picture displayed on a screen or other casino content item and the system integrates it into the wagering game elements).

The system can read information from a user accessible storage device, like an MP3 player or a digital camera, and use that information in casino content (e.g., play a sound or musical file, show a picture from the camera, etc.).

The system can provide a route to a requested game (e.g., the system detects that new game is available that a user has indicated in a preference). In route to that game, the system can target ads to the user as the user walks to the game.

The system can take information from user preferences or selection history and send the information to an intermediary party to review. For example, the system can send the user selection history to a tour operator. The tour operator can determine a trip that the user and others might like to take based on the selection history.

The system can send a saved item to various groups or businesses so that they can compete to provide better offers or similar content.

The system can present selectable and savable objects on a web browser. The web browser can be used to access an online casino website, or any other wagering game website. The system can determine when a user selects (e.g., clicks on) one or more online casino content items or items displayed in the web browser and save the information to the user's hard drive, web account, or other user accessible storage location.

The system can transport casino content between a "brick-and-mortar" casino and a wagering game website. The user can access the casino content by being in the casino and/or by accessing the wagering game website.

Additional Example Operating Environments

This section describes example operating environments, systems and networks, and presents structural aspects of some embodiments.

Wagering Game Machine Architecture

Figure 8:
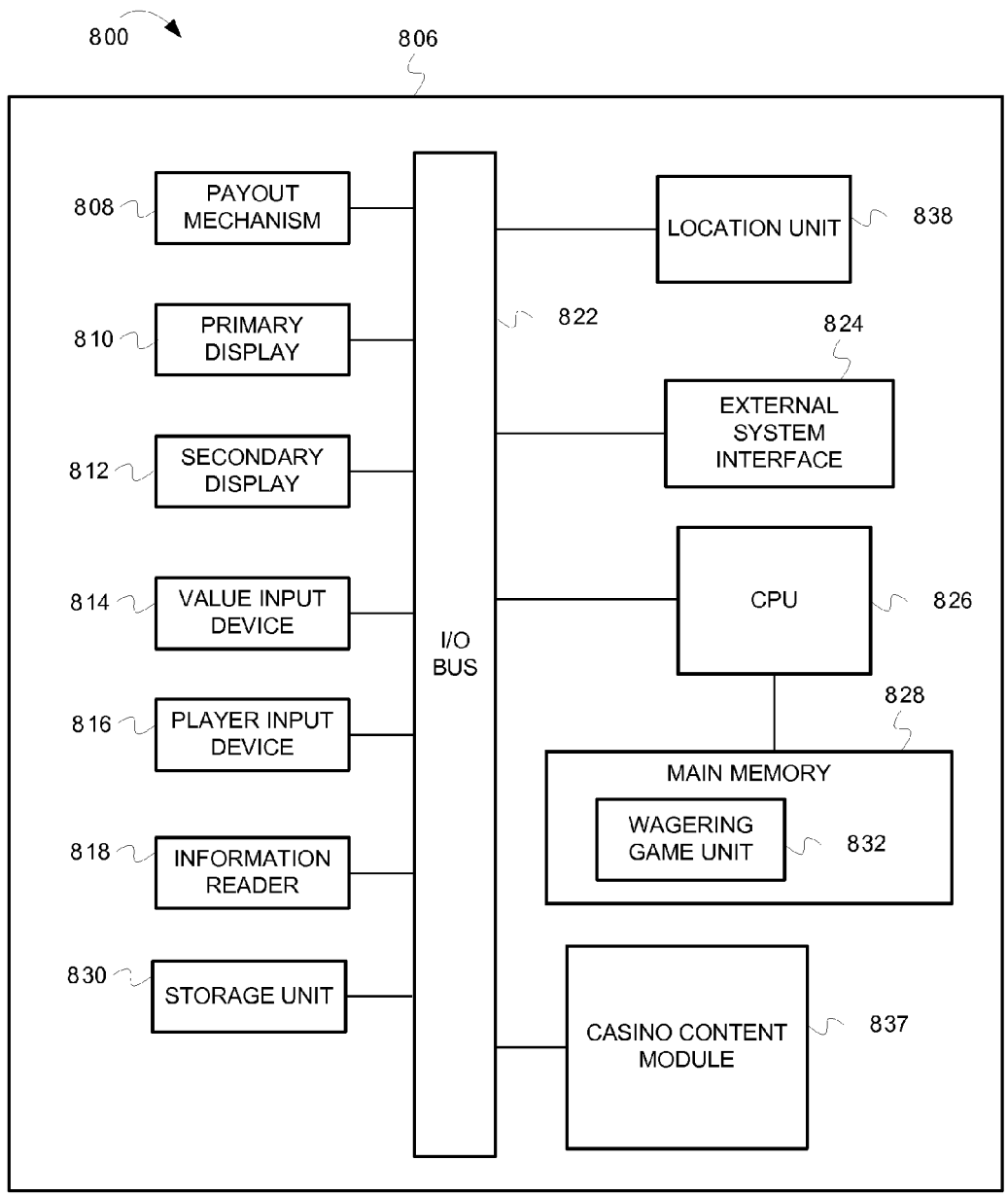
FIG. 8 is an illustration of a wagering game machine architecture 800, according to some embodiments.

FIG. 8 is a conceptual diagram that illustrates an example of a wagering game machine architecture 800, according to some embodiments. In FIG. 8, the wagering game machine architecture 800 includes a wagering game machine 806, which includes a central processing unit (CPU) 826 connected to main memory 828. The CPU 826 can include any suitable processor, such as an Intel® Pentium processor, Intel® Core 2 Duo processor, AMD Opteron™ processor, or UltraSPARC processor. The main memory 828 includes a wagering game unit 832. In some embodiments, the wagering game unit 832 can present wagering games, such as video poker, video black jack, video slots, video lottery, reel slots, etc., in whole or part.

The CPU 826 is also connected to an input/output ("I/O") bus 822, which can include any suitable bus technologies, such as an AGTL+ frontside bus and a PCI backside bus. The I/O bus 822 is connected to a payout mechanism 808, primary display 810, secondary display 812, value input device 814, player input device 816, information reader 818, and storage unit 830. The player input device 816 can include the value input device 814 to the extent the player input device 816 is used to place wagers. The I/O bus 822 is also connected to an external system interface 824, which is connected to external systems 804 (e.g., wagering game networks). The external system interface 824 can include logic for exchanging information over wired and wireless networks (e.g., 802.11g transceiver, Bluetooth transceiver, Ethernet transceiver, etc.)

The I/O bus 822 is also connected to a location unit 838. The location unit 838 can create player information that indicates the wagering game machine's location/movements in a casino. In some embodiments, the location unit 838 includes a global positioning system (GPS) receiver that can determine the wagering game machine's location using GPS satellites. In other embodiments, the location unit 838 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 8, in some embodiments, the location unit 838 is not connected to the I/O bus 822.

In some embodiments, the wagering game machine 806 can include additional peripheral devices and/or more than one of each component shown in FIG. 8. For example, in some embodiments, the wagering game machine 806 can include multiple external system interfaces 824 and/or multiple CPUs 826. In some embodiments, any of the components can be integrated or subdivided.

In some embodiments, the wagering game machine 806 includes a wagering game module 837. The wagering game module 837 can process communications, commands, or other information, where the processing can store and use casino content.

Furthermore, any component of the wagering game machine 806 can include hardware, firmware, and/or machine-readable content including instructions for performing the operations described herein.

Mobile Wagering Game Machine

Figure 9:
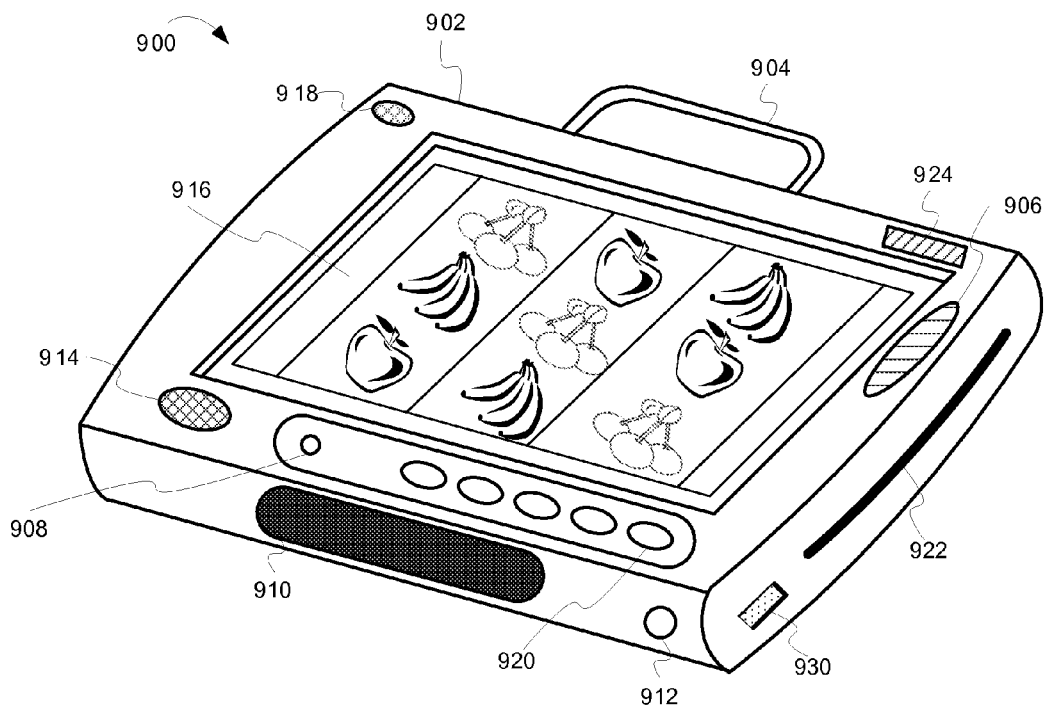
FIG. 9 is an illustration of a mobile wagering game machine 900, according to some embodiments.

FIG. 9 is a conceptual diagram that illustrates an example of a mobile wagering game machine 900, according to some embodiments. In FIG. 9, the mobile wagering game machine 900 includes a housing 902 for containing internal hardware and/or software such as that described above vis-à-vis FIG. 8. In some embodiments, the housing has a form factor similar to a tablet PC, while other embodiments have different form factors. For example, the mobile wagering game machine 900 can exhibit smaller form factors, similar to those associated with personal digital assistants. In some embodiments, a handle 904 is attached to the housing 902. Additionally, the housing can store a foldout stand 910, which can hold the mobile wagering game machine 900 upright or semi-upright on a table or other flat surface.

The mobile wagering game machine 900 includes several input/output devices. In particular, the mobile wagering game machine 900 includes buttons 920, audio jack 908, speaker 914, display 916, biometric device 906, wireless transmission devices 912 and 924, microphone 918, and card reader 922. Additionally, the mobile wagering game machine can include tilt, orientation, ambient light, or other environmental sensors.

In some embodiments, the mobile wagering game machine 900 uses the biometric device 906 for authenticating players, whereas it uses the display 916 and speakers 914 for presenting wagering game results and other information (e.g., credits, progressive jackpots, etc.). The mobile wagering game machine 900 can also present audio through the audio jack 908 or through a wireless link such as Bluetooth.

In some embodiments, the wireless communication unit 912 can include infrared wireless communications technology for receiving wagering game content while docked in a wager gaming station. The wireless communication unit 924 can include an 802.11G transceiver for connecting to and exchanging information with wireless access points. The wireless communication unit 924 can include a Bluetooth transceiver for exchanging information with other Bluetooth enabled devices.

In some embodiments, the mobile wagering game machine 900 is constructed from damage resistant materials, such as polymer plastics. Portions of the mobile wagering game machine 900 can be constructed from non-porous plastics which exhibit antimicrobial qualities. Also, the mobile wagering game machine 900 can be liquid resistant for easy cleaning and sanitization.

In some embodiments, the mobile wagering game machine 900 can also include an input/output ("I/O") port 930 for connecting directly to another device, such as to a peripheral device, a secondary mobile machine, etc. Furthermore, any component of the mobile wagering game machine 900 can include hardware, firmware, and/or machine-readable content including instructions for performing the operations described herein.

The described embodiments may be provided as a computer program product, or software, that may include a machine-readable medium having stored thereon instructions, which may be used to program a computer system (or other electronic device(s)) to perform a process according to embodiments(s), whether presently described or not, because every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A computer-implemented method comprising:
   presenting advertising content on an electronic display associated with a wagering game machine during a wagering game session, wherein the advertising content is configured to be selectable via a first user input, said wagering game machine operable to respond via one or more processors to the first user input;
   determining a selection of the advertising content via the first user input during the wagering game session, wherein use of the wagering game machine during the wagering game session is associated with a player account, and wherein a data store is accessible via the player account;
   detecting a request, via a second user input, to modify appearance of the advertising content;
   generating a copy of the advertising content, wherein the copy of the advertising content is modified according to the request; and
   storing the copy of the advertising content in the data store after the generating the copy of the advertising content, wherein the copy of the advertising content- is accessible from the data store via the player account after the wagering game session.

2. The computer-implemented method of claim 1, wherein the copy of the advertising content comprises one or more of viewable graphics, sound files, object properties, metadata, and commands related to the advertising content.

3. The computer-implemented method of claim 1 further comprising:
   comparing the copy of the advertising content to previously selected advertising content, wherein said previously selected advertising content was previously selected and stored in the data store;
   determining targeted advertising content that is targeted to the player account;
   detecting access to the data store, via the player account, after the wagering game session; and
   presenting the copy of the advertising content and the targeted advertising content in response to the detecting the access to the data store.

4. The computer-implemented method of claim 1 further comprising:
- detecting access to the data store after the wagering game session via a web account associated with the player account, wherein the web account is external to a casino network; and
- presenting the copy of the advertising content via the web account.

5. The computer-implemented method of claim 1 further comprising:
- determining one or more social contact accounts associated with the player account; and
- sending the copy of the advertising content to the one or more social contact accounts.

6. The computer-implemented method of claim 1 further comprising:
- detecting an additional request, after the wagering game session, to present the copy of the advertising content stored on the data store; and
- presenting, in response to detecting the additional request, the copy of the advertising content.

7. One or more non-transitory machine-readable storage media having instructions stored thereon, which when executed by a set of one or more processors causes the set of one or more processors to perform operations comprising:
- determining a selection, via a first user input, of a selectable advertisement presented on a display associated with a wagering game machine during a wagering game session, wherein the wagering game session is associated with a player account;
- detecting a request, via a second user input, to modify appearance of the selectable advertisement;
- generating a copy of the selectable advertisement, wherein the copy of the selectable advertisement is modified according to the request; and
- storing the copy of the selectable advertisement in a data store after the generating the copy of the selectable advertisement, wherein the data store is accessible via the player account after the wagering game session.

8. The one or more non-transitory machine-readable storage media of claim 7, the operations further comprising:
- providing, for presentation, the copy of the selectable advertisement in response to detecting access to the data store via the player account after the wagering game session.

9. The one or more non-transitory machine-readable storage media of claim 7, the operations further comprising:
- generating reproductions of portions of the selectable advertisement;
- modifying appearance of the reproductions of the portions of the selectable advertisement;
- generating the copy of the selectable advertisement using the reproductions of the portions of the selectable advertisement;
- packaging the reproductions of the portions of the selectable advertisement content into one or more files; and
- saving the one or more files in the data storage.

10. The one or more non-transitory machine-readable storage media of claim 7, the operations further comprising:
- accessing user data regarding previously selected advertisements during previous wagering game sessions;
- analyzing metadata from the previously selected advertisements;
- determining, via the analyzing of the metadata, preferences for additional content;
- storing the additional content in the data store;
- detecting access to the data store via the player account after the wagering game session; and
- providing the additional content.

11. The one or more non-transitory machine-readable storage media of claim 10, the operations further comprising:
- determining that the player account meets a level of wagering game activity during the wagering game session; and
- integrating personal content into the additional content, wherein the personal content is associated with the player account.

12. An apparatus comprising:
- means for determining a selection, via a first user input, of content presented via a wagering game machine during a wagering game session, wherein use of the wagering game machine during the wagering game session is associated with a player account, and wherein a data store is accessible via the player account;
- means for generating a copy of the content in response to the selection of the content according to the first user input;
- means for modifying an appearance of the copy of the content according to second user input, wherein the second user input is received during the wagering game session;
- means for generating an electronic file containing the copy of the content after the appearance of the copy of the content is modified according to the second user input; and
- means for storing the electronic file in the data store, wherein the electronic file is accessible from the data store via the player account after the wagering game session.

13. The apparatus of claim 12, wherein the means for modifying the appearance of the copy of the content comprises one or more of resizing the copy of the content, reshaping the copy of the content, editing an appearance of one or more elements of the copy of the content, recording over the copy of the content, and personalizing the copy of the content.

14. The apparatus of claim 12 further comprising:
- means for determining one or more social contacts associated with the player account;
- means for transmitting the electronic file to one or more social network accounts associated with the one or more social contacts; and
- means for converting a first format of the electronic file into a second format that can be read by an application associated with a social network application associated with the one or more social network accounts.

15. The apparatus of claim 12 further comprising:
- means for determining one or more social contacts associated with the player account;
- means for transmitting the electronic file to one or more social network accounts associated with the one or more social contacts;
- means for determining one or more preferences for one or more of the one or more social network accounts and the player account;
- means for determining one or more advertisements using the one or more preferences; and
- means for providing, for presentation, the one or more advertisements to the one or more of the one or more social network accounts and the player account.

16. The apparatus of claim 12 wherein the means for modifying the appearance of the copy of the content comprises means for modifying an appearance of a graphical element of the copy of the content.

17. A system comprising:
at least one input device configured to receive an indication of a wager to play a wagering game;
at least one display device configured to present content for the wagering game;
at least one processor; and
at least one memory device configured to store instructions which, when executed by the at least one processor, cause the system to perform operations to
  present advertising content on the at least one display device, wherein the advertising content is configured to be selectable via a first user input during a wagering game session,
  determine a selection of the advertising content via the first user input during the wagering game session, wherein use of the wagering game machine during the wagering game session is associated with a player account, and wherein a data store is accessible via the player account,
  detect a request, via a second user input, to modify appearance of the advertising content,
  generate a copy of the advertising content, wherein the copy of the advertising content is modified according to the request, and
  store the copy of the advertising content in the data store after the copy of the advertising content is generated, wherein the copy of the advertising content is accessible from the data store via the player account after the wagering game session.

18. The system of claim 17, wherein the at least one memory device is configured to store instructions which, when executed by the at least one processor, further cause the system to perform operations to:
  detect access to the data store after the wagering game session via a web account associated with the player account, wherein the web account is external to a casino network; and
  present the copy of the advertising content via the web account.

19. The system of claim 17, wherein the at least one memory device is configured to store instructions which, when executed by the at least one processor, further cause the system to perform operations to:
  detect an additional request, after the wagering game session, to present the copy of the advertising content stored on the data store; and
  provide, in response to the additional request, the copy of the advertising content.

* * * * *